(12) United States Patent
Fernandez et al.

(10) Patent No.: US 7,487,719 B2
(45) Date of Patent: Feb. 10, 2009

(54) METHOD FOR SEPARATING BANANA CLUSTERS INTO SEPARATE BANANAS

(75) Inventors: Raul Fernandez, Weston, FL (US); Gonzalo Marquez, Miami, FL (US); Kevin Forsyth, Pembroke Pines, FL (US); Julio Vasquez, Batavia, OH (US); Mark Bakhakh, St. Petersburg (RU); Yury Buch, St. Petersburg (RU); Sergey Klimin, St. Petersburg (RU); Vladimir Vasiliev, St. Petersburg (RU); Oleg Feigenson, St. Petersburg (RU); Illya Ilyin, St. Petersburg (RU); Yuriy Yaess, St. Petersburg (RU)

(73) Assignee: Chiquita Brands International, Inc., Cincinnati, OH (US)

( * ) Notice: Subject to any disclaimer, the term of this patent is extended or adjusted under 35 U.S.C. 154(b) by 407 days.

(21) Appl. No.: 11/427,166

(22) Filed: Jun. 28, 2006

(65) Prior Publication Data

US 2007/0095771 A1    May 3, 2007

Related U.S. Application Data

(60) Provisional application No. 60/695,371, filed on Jun. 30, 2005.

(51) Int. Cl.
*A23N 15/00* (2006.01)
*A23N 15/02* (2006.01)
*B26D 7/06* (2006.01)
*B26D 1/44* (2006.01)
*B26D 1/147* (2006.01)

(52) U.S. Cl. ................... 99/638; 99/537; 99/642; 99/643; 426/478; 426/518; 56/244; 56/245; 56/249; 56/290; 56/295

(58) Field of Classification Search ................. None
See application file for complete search history.

(56) References Cited

U.S. PATENT DOCUMENTS

| 1,514,680 | A |   | 11/1924 | Straub |        |
|-----------|---|---|---------|--------|--------|
| 2,066,478 | A | * | 1/1937  | Lewin, Jr. | 211/206 |
| 2,746,146 | A | * | 5/1956  | Schiro | 30/272.1 |
| 4,773,324 | A | * | 9/1988  | Wylie et al. | 99/638 |

(Continued)

FOREIGN PATENT DOCUMENTS

GB        359240      10/1931

(Continued)

OTHER PUBLICATIONS

International Search Report, PCT/US2006/025723, Oct. 23, 2006.

*Primary Examiner*—Joseph M Pelham
(74) *Attorney, Agent, or Firm*—Steven J. Goldstein; Frost Brown Todd LLC

(57) ABSTRACT

This application discloses a method for separating banana clusters into individual fruits. In this method, the banana cluster is hung on a carrier (such as a cable) in such a way that the hanging point is the place where the banana fruit stalks converge (at the crown). The cluster and/or the cutter are moved toward each other and the cutter is positioned such that the cutter cuts the fruit stalks at a point lower than the cluster hanging point.

10 Claims, 3 Drawing Sheets

U.S. PATENT DOCUMENTS

| | | | |
|---|---|---|---|
| 4,784,057 A | | 11/1988 | Mietzel et al. |
| 5,050,492 A | | 9/1991 | Wotton et al. |
| 5,199,580 A | * | 4/1993 | Bankier ............... 211/113 |
| 5,287,973 A | * | 2/1994 | Bankier ............... 211/113 |
| 7,080,498 B2 | * | 7/2006 | Etcheverry ............ 56/328.1 |
| 2002/0108362 A1 | * | 8/2002 | Amaro et al. ............ 56/330 |
| 2006/0213171 A1 | * | 9/2006 | Etcheverry ............ 56/331 |

FOREIGN PATENT DOCUMENTS

| | | |
|---|---|---|
| GB | 1077435 | 4/1996 |
| JP | 8116944 | 5/1996 |

* cited by examiner

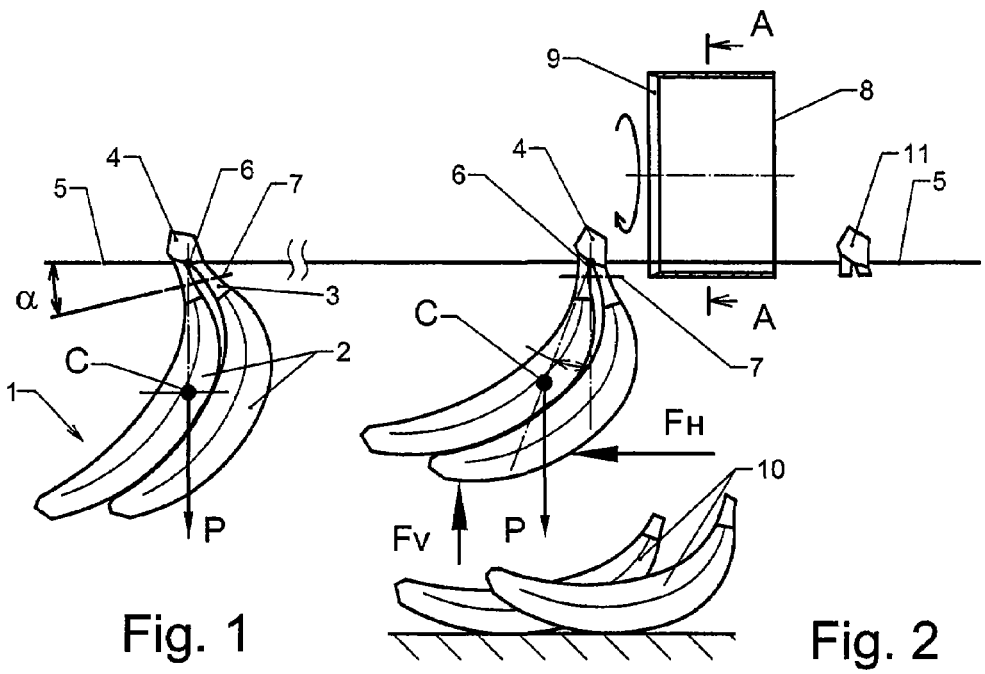
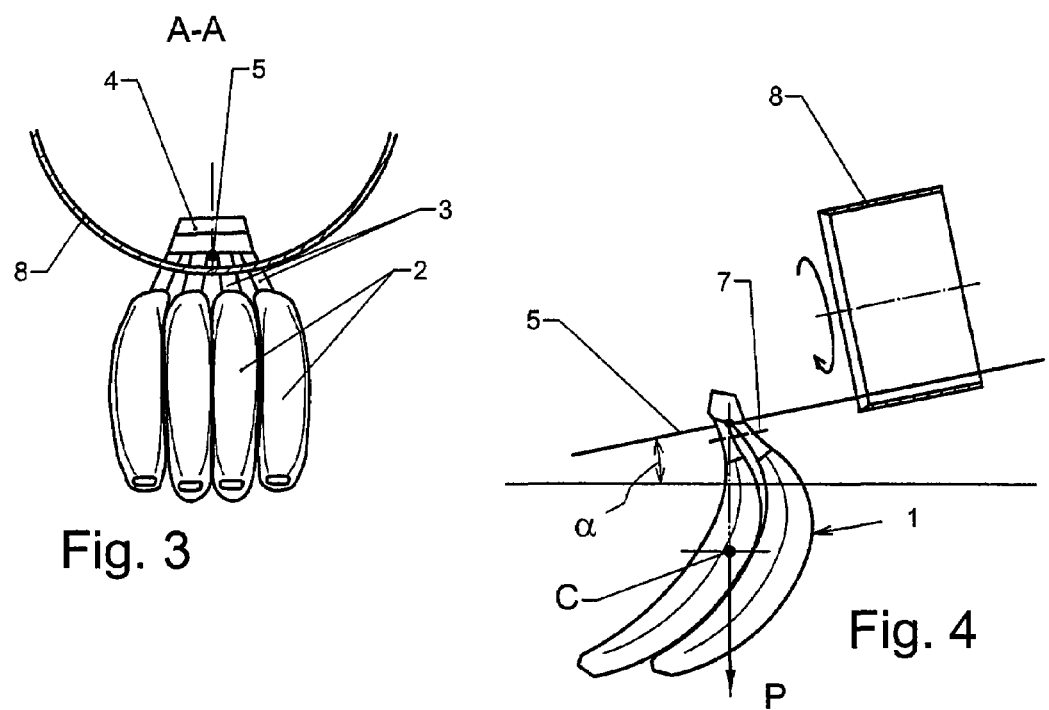
Fig. 1  Fig. 2  Fig. 3  Fig. 4

METHOD FOR SEPARATING BANANA CLUSTERS INTO SEPARATE BANANAS

This application is based on and claims priority from the U.S. Provisional Application No. 60/695,371, Fernandez et al., filed Jun. 30, 2005, incorporated herein by reference.

TECHNICAL FIELD

The invention is related to the field of industrial banana processing. Specifically, it relates to the separation of banana clusters into individual fruits for their further processing, packaging and retailing.

BACKGROUND OF THE INVENTION

As everyone knows, bananas grow in bunches and they are generally marketed to the public in clusters (i.e., a portion of a bunch consisting of several bananas attached together at their crowns). Sometimes it is desired to sell individual bananas to the consumer. The separation of these individual bananas from the clusters in a cost-effective way, without damaging them, is not an easy problem. The inventors herein are not aware of any existing methods or means for mechanically separating banana clusters into individual bananas on a large scale automated basis. In the areas of banana harvesting and processing, the following patent may be relevant—GB 1077435. This patent describes a semi-cylindrical cutting tool for manually cutting banana clusters off the tree trunk. The cutter is not designed for an automated process or for separating those clusters into individual bananas.

Nevertheless, there have been engineering solutions related to the separation of clusters into individual fruits, as applied to other types of fruit (other than bananas).

A device has been disclosed for separation of cherry clusters into individual cherries ("Cherry Splitter," U.S. Pat. No. 5,050,492, Watton, et al., issued Sep. 24, 1991). The device separates a cluster of cherries while retaining the maximum length of the cherry stems. The cherries are arranged horizontally on belt conveyors that are positioned close to one another. The conveyors are strung along several pairs of cutters and separating guides, installed one behind another along one line.

A cluster moves on the belts into the operating zone of the separator. The separator is a revolving disk that ensures: a) the divergence of cherry stems to different sides, and b) that the cluster is oriented in such a way that when it goes under the disk cutter, the stems are on different sides of the disk. This allows cutting the cluster into two parts while preserving stems.

The patent "Tandem Drum Cluster Separator," U.S. Pat. No. 4,784,057, Mietzal, et al., issued Nov. 15, 1988, describes a device for separation of pod vegetable clusters. It includes two horizontally arranged drums with a cylindrical surface. Each drum is equipped with rods that are secured on its cylindrical surface and directed radially outward. The free ends of the rods are equipped with upward-facing hooks. During operation of the device, pod clusters fall into the space between the drums. As they fall, they get hooked on the rods. The drums, rotating in opposite directions, bring the rods with hanging clusters out of the confined area between the drums; the rods transfer the clusters toward sickle-shaped knives located under the rods in such a way that the knives cut the pods off clusters at the base of the stem.

A device also exists for separation of petals from the edible chrysanthemum flower cup ("Separation of petals of edible chrysanthemum and separator for petal," Japanese Patent 8116944, published May 14, 1996). The device includes a support on which the flower is located—a vertical, hollow, truncated cone, its smaller (upper) end having an opening that corresponds to the size of the flower cup. The flower is positioned on the support in such a way that the cup is located above the upper hole, and the petals fall long the sides of the cone. To separate the cup from the petals, the device uses a lever and a stamping punch.

The structure of banana clusters and the shape of bananas differ significantly from cherry clusters, pod vegetables, and chrysanthemum flowers. Therefore, none of the above-described inventions can be used to separate banana clusters into individual fruits.

SUMMARY OF THE INVENTION

The invention claimed herein presents a method for the mechanized separation of banana clusters into individual fruits, while preserving the integrity of each fruit, including the fruit stalk. In this method, the banana cluster is hung on a carrier, using the point of convergence of fruit stalks as the hanger. The cluster and/or cutter are then moved toward one another, and the fruit stalks are cut with the cutter; the cutting edge of the cutter passes lower than the hanger point of the cluster.

The banana cluster hangs in such a way that makes it possible to mechanically move it to the cutter (or, to move the cutter with respect to the cluster), to cut the banana fruit stalks. This creates the possibility of automating the process of separating banana clusters into individual fruits. In selecting optimal design options for the carrier and cutter, it is necessary to consider the shape of the individual bananas and the cluster as a whole, including the fact that banana fruit stalks fan out from the crown that holds them together.

The carrier can be a cable. The cluster can easily be hung on the cable by manually threading the cable between the bananas. The hanging point of the banana cluster will be the point of fruit stalk convergence; the bananas with fruit stalks will hang lower than the cable, offering the cutter unobstructed access to fruit stalks. Since bananas have a characteristic bend to one side, the cluster hung on the cable appears to be oriented with the bananas' convex side along the cable. This peculiarity can also be considered when the shape of the cutter is being selected and when the cutter is installed with respect to the carrier cable.

When a cluster hung according to the indicated method is hanging freely, the banana fruit stalks deflect from the vertical line. Consequently, if the cutting line is oriented in parallel to the cable (which is important from the viewpoint of engineering implementation of the cutter and devices that ensure mutual travel of cluster and cutter), fruit stalks of different bananas will be cut at different levels. Moreover, it is possible that the cutter will not cut the banana at the fruit stalk, but will "capture" the banana pulp, which is unacceptable, for example, in cases when the bananas are being prepared for packaging and retailing. To eliminate that disadvantage, the banana cluster can be hung with its convex side facing the cutter. To cut the fruit stalks, the cutter is oriented in such a way that the cutting line passes horizontally, and the banana cluster is deflected (with respect to its hanging point) from its free-hanging position to the side opposite the cutter.

Taking into account how the cluster hangs—with its convex side facing the cutter—its deflection (with respect to the hanging point) from free-hanging to the side opposite the cutter, leads to the fruit stalks being oriented predominantly vertically or perpendicular to the indicated direction of the cutting line. As a result, the fruit stalks are all cut approximately at the same level, and it is possible to avoid undesirable pulp capturing.

A similar result can be achieved if, while the cluster is oriented with its convex side toward the cutter, the cutting line is directed downward at a sharp horizontal angle, away from the cutter, toward the cluster. Or, while the cluster is hanging freely, the cutting line is directed downward at a sharp horizontal angle, away from the cluster, toward the cutter.

In the simplest case, the cutter can be a disk knife. This shape ensures free installation of the cutter at a level that is lower than the cluster's hanging point, and allows for easy cutting of the fruit stalks.

However, with the disk knife cutter, the fan-like shape of the banana cluster can cause the fruit stalks to be cut at different levels, and may even include cases of banana pulp cutting. To eliminate this disadvantage, the cutting edge of the cutter can be curvilinear, taking the shape of the cluster into account. Specifically, the cutter can be in the form of a hollow cylinder, installed so it could revolve, with its axis positioned above the hanging point of the banana cluster. Then, the butt of the cylinder performs the cutting function.

To coagulate latex that flows out of the cut fruit stalk, and to preserve the market quality of an individual banana, it is reasonable to heat the cutting edge of the cutter to about 110-190° C. If a metal cutting edge is used, it could potentially be heated using high-frequency current.

BRIEF DESCRIPTION OF THE DRAWINGS

The invention is illustrated with the following drawings. These drawings are intended to exemplify, not limit, the present invention.

FIGS. 1-4 illustrate cutter examples when the banana cluster is hanging on a cable, with its convex side facing the cutter.

FIG. 1 illustrates a banana cluster, freely hanging on the cable.

FIG. 2 illustrates the method using a cylinder-shaped cutter, where the cluster and/or cutter travel horizontally toward each other.

FIG. 3 presents a view of the hanging banana cluster as seen from the cylinder-shaped cutter, this view illustrating the shape of the banana cut.

FIG. 4 illustrates the use of a cylinder-shaped cutter, where the cluster and cutter travel toward each other at an angle to the horizontal direction.

FIG. 5 shows a banana cluster that is hanging freely on the carrying cable.

FIG. 6 illustrates the method of using a cylinder-shaped cutter, where the cluster and cutter travel toward each other, in the horizontal direction.

FIG. 7 illustrates the method of using a cylinder-shaped cutter, where the cluster and cutter travel toward each other, at an angle to the horizontal direction.

DETAILED DESCRIPTION OF THE INVENTION

Figure 5:
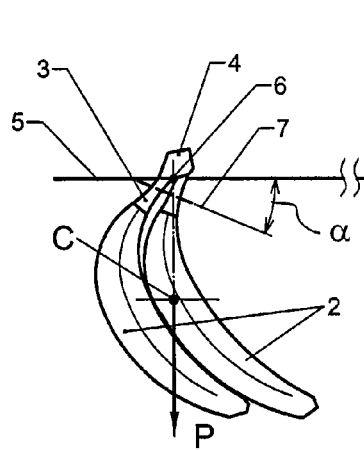
FIGS. 5-7 illustrate examples of implementation of the method where the banana cluster is hung on the cable and oriented with its convex side away from the cutter.

A cluster (1) of bananas (2) (See FIG. 1), with fruit stalks (3) that fan from the crown (4), is hung on the cable (5) that is threaded between bananas. As seen in FIG. 1, the point (6) of hanging the cluster on the cable is the place of convergence of fruit stalks. FIG. 1 also shows a desirable direction (7) for cutting the fruit stalks, which, taking into account the shape of the cluster of bananas, is oriented at an angle ($\alpha$). For bananas of different types, that angle constitutes approximately 25-45°. FIG. 1 also shows the force of gravity (P) on the freely hanging cluster, as related to the cluster's center of gravity (C), which is on the same vertical line with the point of the hanging cluster.

In the analyzed example (See FIG. 2), the cluster is hung on the cable in such a way that its convex side is oriented towards the cutter (8). The cutter is a hollow cylinder that revolves, its butt being the cutting edge (9). The cutter (See FIG. 3) is installed so its revolution axis is parallel to the cable, and the cable passes through the internal space of the cutter. The cutting edge of the cutter passes lower than the cable at the level where fruit stalks are cut.

For the cutter to cut fruit stalks in the desirable direction, the cluster (with respect to point of hanging (6)) is deflected by the angle ($\alpha$) from the position of freely hanging in the direction opposite to the cutter. This can be done, for example, due to forces $F_H$ and $F_V$, applied to the lower part of the cluster and directed as shown in FIG. 2. As a result, the fruit stalks (3) are cut by the cutter in the desired direction.

In one embodiment, the cut bananas fall under their own weight onto a branching conveyer or a banana collector box (not shown in FIG. 2), while the cut part of the crown (11) is removed from the cable.

Another way to attain the same result, does not require that the cluster be deflected (as is shown in FIG. 2). Rather, the cable and cutter may be installed at an angle with respect to horizontal position, as shown in FIG. 4. In that embodiment, the cluster remains in a freely hanging position.

Figure 6:
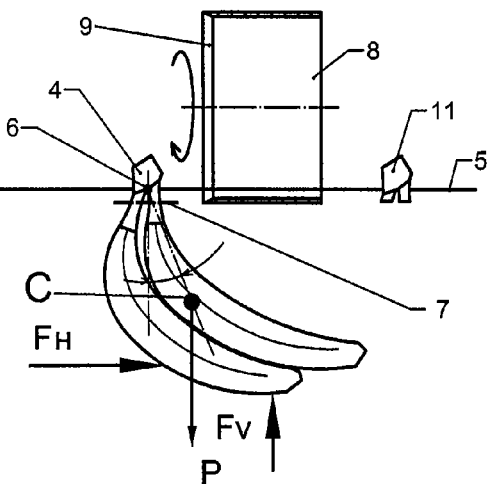
Figure 7:
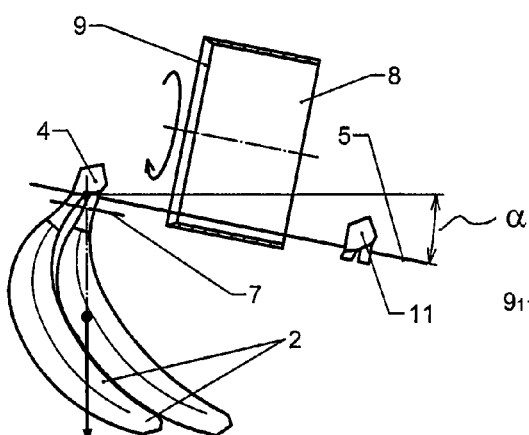

A similar result can be attained if the cluster is hung on the cable in such a way as to orient the convex side of the cluster away from the cutter. This is shown in FIGS. 5-7.

The cluster (see FIG. 5) is hung on the cable that has been threaded between bananas. Correspondingly, the point of the hanging cluster on the cable is the place of convergence of fruit stalks. FIG. 5 also shows the desirable direction of cutting fruit stalks, which, with regard to the shape of the cluster is oriented at an angle, but in the opposite direction to the one shown in FIG. 1.

For the cutter (see FIG. 6) to cut the fruit stalks in the desired direction, in a way similar to that shown earlier in FIG. 2, the cluster (with respect to point 6) is deflected from its free-hanging position by the angle ($\alpha$), towards the cutter. This can also be achieved due to forces $F_H$ and $F_V$, applied to the lower part of the cluster and directed as shown in FIG. 6. As a result, the fruit stalks are cut by the cutter in the desired direction. In a way similar to that shown earlier in FIG. 2, it is possible to install the cable and cutter at an angle with respect to the horizontal position, as shown in FIG. 7. In that embodiment, the cluster remains in a freely hanging position.

Figure 8:
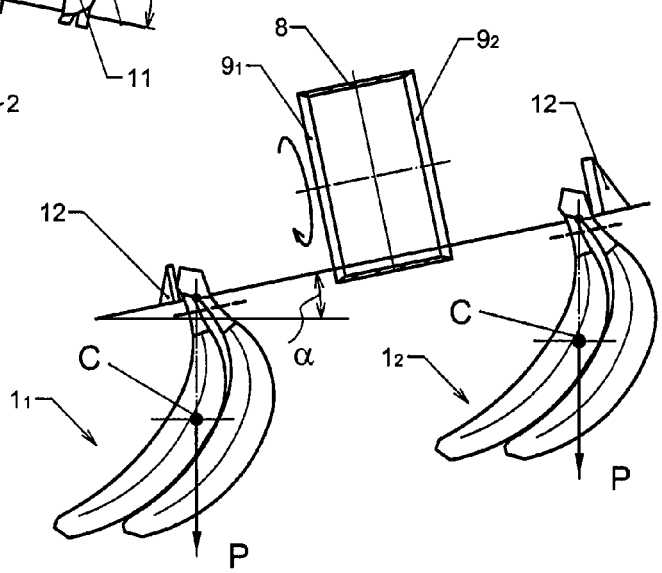
FIG. 8 shows an alternative for implementing the method with dual-sided feeding of banana clusters to the cylinder-shaped cutter.

FIG. 8 shows an alternative for implementation of this method with a dual-sided feeding of clusters to a cylinder-shaped cutter having two butt cutting edges ($9_1$ and $9_2$). An equivalent scheme for cluster $1_1$, which is on the left in FIG.

8, is the one presented in FIG. 4; an equivalent scheme for cluster 1₂, which is on the right in FIG. 8, is the one presented in FIG. 7. Clusters 1₁ and 1₂ are hung on the cable. On one side of the cutter, cluster 1₁ is hung with its convex side toward the cutter; on the other side of the cutter, cluster 1₂ is hung with its convex side away from the cutter. Pushers (12) installed on the cable ensure alternating feeding of clusters 1₁ and 1₂ to the cutter.

Figure 9:
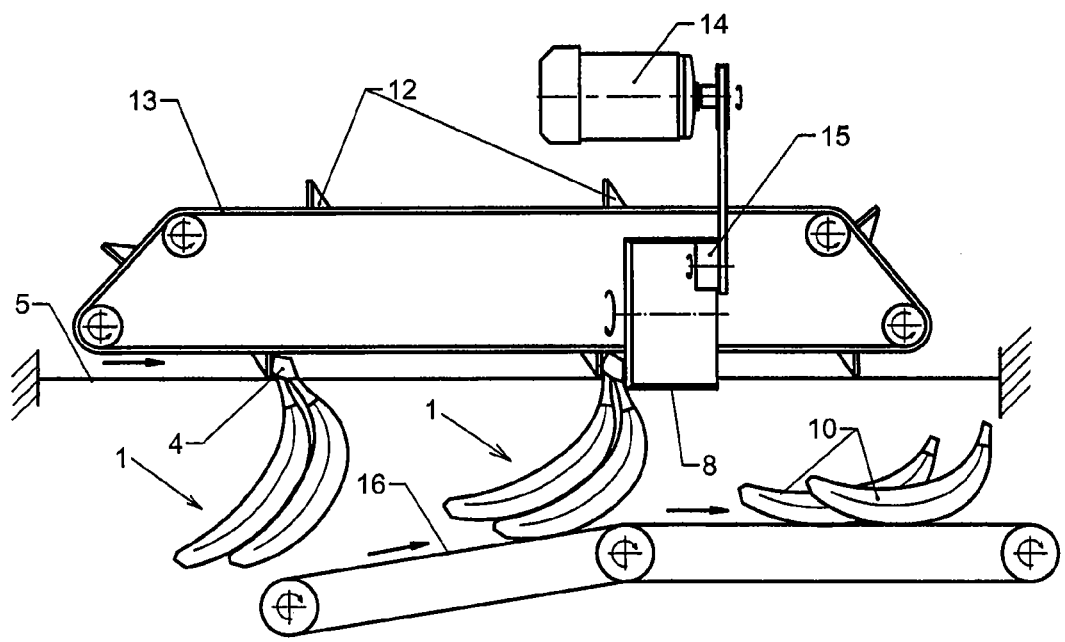
FIG. 9 shows an example of a device for the implementation of the method described herein.

FIG. 9 shows an example of a device intended for the implementation of the method described here. A horizontally stretched cable, on which clusters are hung, is used as a carrier. A belt conveyer (13) with pushers installed on its belt is used for feeding the cluster to the cutter. Pushers alternatively hook the cluster hung on the cable by the crown (4) and move it to the cutter. The cylinder-shaped cutter (8) is set into motion by an electric motor (14) through friction transmission (15).

To deflect the cluster from its free-hanging position for the period necessary for cutting fruit stalks, the illustrated device includes another belt conveyer (16) installed in the cutting zone, under the clusters. The level and angle of positioning of the conveyer (16) with respect to the cable is determined based on the following considerations. When the cluster is fed to the cutter, the lower tip of the cluster gets to the conveyer (16). Since the conveyer (16) is installed with a certain ascent towards the cutter, the lower tip of the cluster—while bearing against the belt of the conveyer (16)—starts to ascend with the movement of the belt. Correspondingly, the cluster starts to deflect to the opposite side from the cutter with respect to its hanging point. When the cluster reaches the cutter, this deflection should constitute the above-mentioned angle (α). Linear velocity of movement of the conveyer (16) is coordinated with the linear velocity of the other conveyer (13).

The cut bananas (10) fall onto the conveyer belt (16) and are delivered for further processing. Use of the conveyer (16) is not essential. It is sufficient to install a support of similar profile, characterized by a low coefficient of gliding friction.

Figure 10:
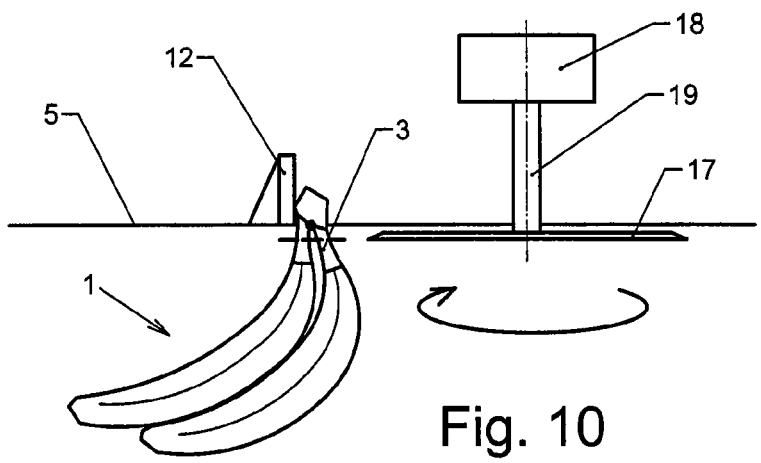
FIG. 10 shows an example of implementation of the method using a disk knife, side view.
Figure 11:
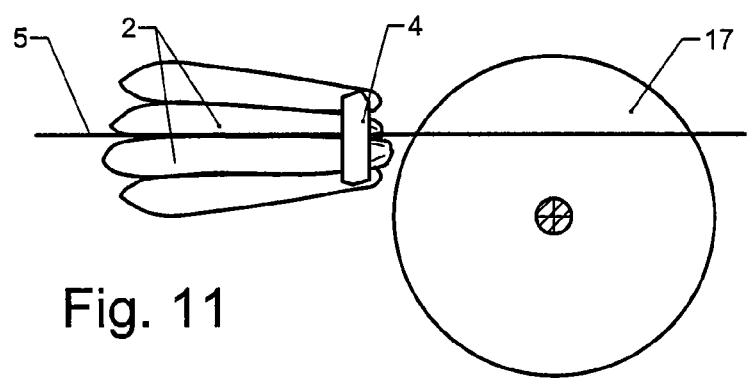
FIG. 11 shows the same view from above.

If the requirements as far as the point of cutting fruit stalks are not strict, then, it is actually not necessary to orient the cluster with respect to the direction of the cut. In another embodiment, the cutter can have a less elaborate shape than that of a hollow cylinder. It can be a disk knife (17), as shown in FIGS. 10 and 11.

To avoid any interference with transportation of cut bananas, the drive (18) of the knife (17) can be positioned above the cable. Then, the shaft (19) on which the knife is installed would be shifted laterally from the cable, which would not hinder the installation of the knife lower than the cable on the level of fruit stalks.

The examples presented in FIGS. 1-11 are intended to be exemplary only and are not intended to describe all embodiments of the present invention.

What is claimed is:

1. Method for separation of a banana cluster into individual fruits, using a cutter having a cutting edge, wherein a banana cluster is hung on a cable in such a way that the cluster hanging point is the place where the fruit stalks converge, such that the cable is threaded between individual bananas, after which the cluster and/or cutter are moved one toward the other, thereby cutting the banana fruit stalks with the cutter at a point lower than the cluster hanging point.

2. The method according to claim 1 wherein the banana cluster is hung such that its convex side is oriented in the direction of the cutter.

3. The method according to claim 2 wherein, during cutting the fruit stalks, the cutter is oriented in such a way that the cutting line passes in the horizontal direction; and the banana cluster is deflected (with respect to its hanging point) from the free-hanging position away from the cutter.

4. The method according to claim 2 wherein, during cutting the fruit stalks, the cutter is oriented in such a way that the cutting line passes at an acute angle to the horizontal direction and is oriented downwards, in the direction away from the cutter toward the banana cluster.

5. The method according to claim 1 wherein the banana cluster is hung such that its convex side is oriented away from the cutter.

6. The method according to claim 5 wherein, while cutting the fruit stalks, the cutter is oriented in such a way that the cutting line passes in the horizontal direction and the banana cluster is deflected (with respect to the hanging point) from its free-hanging position in the direction of the cutter.

7. The method according to claim 5 wherein, while cutting the fruit stalks, the cutter is oriented in such a way that the cutting line passes at an acute angle to the horizontal direction and is oriented downwards, in the direction from the banana cluster to the cutter.

8. The method according to claim 1 wherein the cutter is a disk knife.

9. The method according to claim 1 wherein the cutter is a hollow cylinder installed in such a way that it can rotate, and its axis is positioned above the banana cluster hanging point, such that the cylinder end serves as a cutting edge.

10. The method according to claim 1 wherein the cutting edge of the cutter is heated to about 110-190° C.

* * * * *